(12) United States Patent
O'Hanley et al.

(10) Patent No.: US 11,759,837 B1
(45) Date of Patent: Sep. 19, 2023

(54) SYSTEMS AND METHODS FOR LAUNCH VEHICLE DOME MANUFACTURING

(71) Applicant: ABL Space Systems, El Segundo, CA (US)

(72) Inventors: Harrison O'Hanley, Los Angeles, CA (US); Daniel Piemont, Los Angeles, CA (US)

(73) Assignee: ABL SPACE SYSTEMS, El Segundo, CA (US)

( * ) Notice: Subject to any disclaimer, the term of this patent is extended or adjusted under 35 U.S.C. 154(b) by 213 days.

(21) Appl. No.: 16/654,577

(22) Filed: Oct. 16, 2019

Related U.S. Application Data

(60) Provisional application No. 62/750,037, filed on Oct. 24, 2018.

(51) Int. Cl.
*B21D 5/08* (2006.01)
*B21D 5/00* (2006.01)
*B64G 1/40* (2006.01)
*B60K 15/03* (2006.01)

(52) U.S. Cl.
CPC ............... *B21D 5/008* (2013.01); *B60K 15/03* (2013.01); *B64G 1/402* (2013.01); *B60K 2015/03032* (2013.01)

(58) Field of Classification Search
CPC ......... B21D 5/008; B64G 1/402; B60K 15/03; B60K 2015/03032
See application file for complete search history.

(56) References Cited

U.S. PATENT DOCUMENTS

| | | | | |
|---|---|---|---|---|
| 6,199,419 | B1* | 3/2001 | Shrayer et al. | B21D 22/16 72/69 |
| 6,660,106 | B1* | 12/2003 | Babel et al. | B21D 22/14 148/527 |
| 7,201,811 | B2* | 4/2007 | Babel et al. | B21D 22/14 148/535 |
| 7,971,463 | B2* | 7/2011 | Forrest et al. | B21D 22/16 72/67 |
| 2017/0268087 | A1* | 9/2017 | Palitsch et al. | F01D 5/30 |

OTHER PUBLICATIONS

Kaufman, J. Gilbert; "Introduction to Aluminum Alloys and Tempers", 2000, ASM International, Chapter 4, pgs. 39-41, 57-76 (Year: 2000).*

* cited by examiner

*Primary Examiner* — Ryan J. Walters
(74) *Attorney, Agent, or Firm* — Hogan Lovells US LLP

(57) ABSTRACT

A method for forming a dome used in a launch vehicle includes cutting a disk from a plate, the disk having a first disk diameter. The method also includes forming a bend in the disk, the bend applying a curvature to at least a portion of the disk, the disk having a second disk diameter after the forming. The method further includes performing a first heat-treating process to the disk. The method also includes performing a second heat-treating process to the disk. The method further includes machining the disk to remove at least a portion of a thickness of the disk.

20 Claims, 4 Drawing Sheets

SYSTEMS AND METHODS FOR LAUNCH VEHICLE DOME MANUFACTURING

CROSS REFERENCE TO RELATED APPLICATIONS

This application claims priority to and the benefit of co-pending U.S. Provisional Application Serial No. 62/750,037 filed Oct. 24, 2018 titled "DOME MANUFACTURING FOR LAUNCH VEHICLE", the full disclosure of which is hereby incorporated herein by reference in its entirety for all purposes.

BACKGROUND

Launch vehicles are utilized to transport a payload into orbit. The launch vehicles may include several sections and components, such sections that hold fuel to facilitate launch and transport. For example, fuel contain components may be substantially pill-shaped and include barrel sections (tube-like cylindrical walls) with domed end caps. These sections may be formed from a variety of materials, however, for aerospace applications the materials are subject to extreme temperatures and pressures. Aluminum may be used due to its material properties. However, processes for forming and shaping aluminum, and other aerospace materials, may be expensive and time consuming. For example, hot spinning processes are costly due to the time of formation along with specialized tooling utilized in the process.

BRIEF DESCRIPTION OF THE DRAWINGS

Various embodiments in accordance with the present disclosure will be described with reference to the drawings, in which.

DETAILED DESCRIPTION

Figure 1:
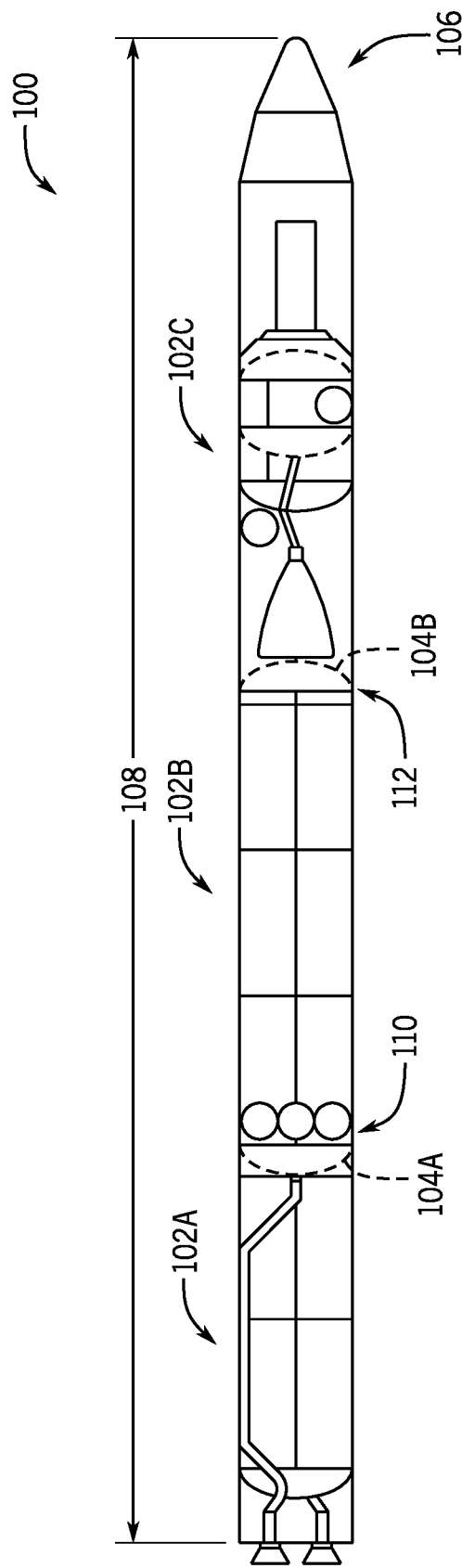
FIG. 1 illustrates a schematic diagram of an embodiment of a launch vehicle, in accordance with embodiments of the present disclosure.

Systems and methods in accordance with various embodiments of the present disclosure may overcome one or more of the aforementioned and other deficiencies experienced in conventional approaches for forming thrust chambers utilized in rocket engines.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", "other embodiments", or "various embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Furthermore, when describing certain features that may be duplicative between multiple items, the features may be designated with similar reference numerals followed by a corresponding identifier, such as "A" or "B".

In various embodiments, systems and methods are described to fabricate low cost launch vehicle domes with reduced lead times. The process may be adapted to form domes having a variety of shapes and being formed from a variety of different materials, however, embodiments of the present disclosure may be discussed with reference to aluminum, such as 2219 aluminum alloy or other 2000 series alloys. In various embodiments, a multi-step process is executed in order to generate a launch vehicle dome from a flat sheet of material, such as aluminum.

In various embodiments, methods for fabricating launch vehicle domes may include cutting a disk out of the flat sheet to serve as an initial template for the dome. The disk may further be annealed or otherwise tempered. Thereafter, the disk may be formed into an elliptical shape utilizing one or more forming processes, such as a bump forming process. The bump forming process may be held to looser or larger tolerances than traditional forming processes used for launch vehicle domes, thereby reducing tooling costs and time for manufacturing. In various embodiments, a flange may be added to the formed disk and then the formed disk may undergo one or more heat treatment processes. For example, a first heat treatment may be an anneal process to remove residual stresses from the forming process while the second heat treatment may be to strengthen the formed disk. In embodiments, the formed disk may then be machined, for example, to remove excess materials and bring the formed disk within predetermined size requirements. The machining process may enable the inclusion of tighter tolerances, which when added at the back end of the process, may be easier to achieve with reduced costs.

Embodiments of the present disclosure may be utilized for a variety of applications, such as generation of a launch vehicle. For example, the dome may be used within an expendable, two-stage launch vehicle that utilizes liquid oxygen (LOX) and rocket propellant-1 (RP-1) as propellants. However, it should be appreciated that embodiments may be applicable to both expandable and reusable launch vehicles, as well as single, two, and multi-stage launch vehicles. Moreover, the launch vehicles may be ground or air launch vehicles that may also utilize different fuel sources and/or combinations of various fuel sources. Additionally, the liquid propellant engines may be turbopump fed or not turbopump fed and may also include a gas generator cycle, or other cycle, such as a staged combustion cycle. The processes described herein may further be utilized with launch vehicles having a variety of sizes, as the forming and machining processes do not utilize specialized dies and the like, such as traditional methods, and therefore may be adjusted for a variety of different sizes without incurring substantial tooling costs.

Various embodiments of the present disclosure may be directed toward a primary structure of a launch vehicle. The primary structure serves both as propellant tanks and as the main structural skeleton of the vehicle. The elements of the primary structure can be carbon fiber, metallic (such as aluminum), or a variety of other materials. The primary structure may be formed from two major components: barrel sections and domes. The barrel sections make up the bulk of the primary structure and are effectively cylindrical sections. The domes are the end caps of the barrel sections and close off the tanks to contain the propellant. In various embodiments, the domes have a 2:1 elliptical profile, however, it should be appreciated that various other profiles may also be manufactured utilizing embodiments of the present disclosure.

Traditionally, dome sections are formed using hot spinning processes, which is both costly and has extended lead times for parts. During a hot spinning process, a flat sheet of material, such as aluminum, is positioned on a spinning lathe. The flat sheet is heated with torches, or another heat source, and spun to mechanically form the dome. The dome conforms to a die having the desired shape. The components of this process, as noted above, are expensive because of the specialized tooling and the high loading that the die undergoes. Embodiments of the present disclosure overcome the challenges of previous methods by introducing systems and methods to manufacture domes at lower costs with reduced lead times.

FIG. 1 is a schematic diagram of an embodiment of a launch vehicle 100 including three barrel sections 102A, 102B, 102C, two domes 104A, 104B, and a nose 106. It should be appreciated that various components have been removed for clarity with the following discussion. In the illustrated embodiment, the barrel sections 102A-102C form a majority of a length 108 of the launch vehicle 100. The barrel section 102B includes the domes 104A, 104B at respective ends 110, 112, thereby forming a sealed section, which may be used to transport fuel. As noted above, the number of barrel sections 102 and domes 104 may vary for particularly selected applications and the illustrated embodiment is for example purposes only.

Figure 2:
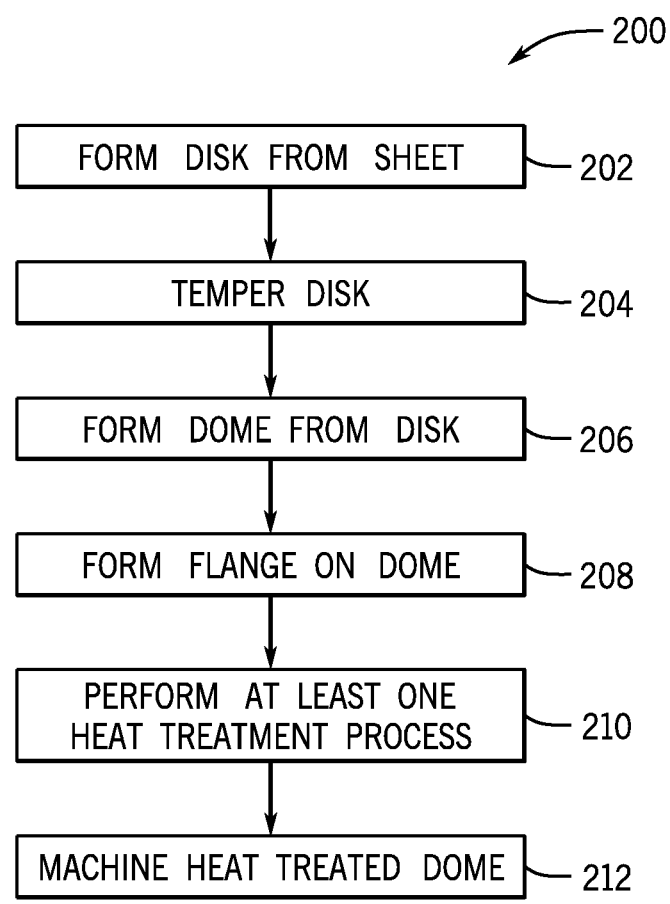
FIG. 2 illustrates a flow chart of an embodiment of a method for forming a dome, in accordance with embodiments of the present disclosure.

FIG. 2 is a flow chart representing a method 200 for coupling two segments together. It should be understood that, for any process discussed herein, there can be additional, fewer, or alternative steps performed in similar or alternative orders, or in parallel, within the scope of the various embodiments. The method begins with forming a disk from a sheet 202. For example, the sheet may be a flat sheet, formed from a material such as aluminum, steel, or the like. While embodiments may describe a uniform sheet (e.g., a sheet formed from a particular type of material), it should be appreciated that in various embodiments the sheet may be a multi-material component. For example, the sheet may include a shell having a first material and a lining or clad portion coupled (e.g., welded, bonded, etc.) to the shell. It should be appreciated that, in various embodiments, the sheet may have a substantially uniform thickness. However, the sheet may also have variable thicknesses. For example, areas that are anticipated as undergoing larger deformation or machining may be thicker in order to reduce warpage or other manufacturing defects. The disk may be cut using any reasonable manufacturing method, such as a water jet process, or the like. In various embodiments, a disk diameter is greater than a dome diameter. For example, a final diameter of the dome may be known and the disk may be cut having a diameter approximately 10 percent larger than the dome diameter, approximately 15 percent larger than the dome diameter, approximately 20 percent larger than the dome diameter, approximately 25 percent larger than the dome diameter, approximately 30 percent larger than the dome diameter, or any other reasonable range. It should also be appreciated that the disk diameter may be between approximately 10 percent and approximately 20 percent larger than the dome diameter, between approximately 15 percent and approximately 25 percent larger than the dome diameter, between approximately 20 percent and approximately 30 percent larger than the dome diameter, or any other reasonable range. As will be appreciated, adding the extra size may be advantageous during forming and other processes.

The method may continue strengthening the disk 204, for example via tempering or annealing the disk 204. An annealing process may be used, which may include a heat-treating process to bring the disk to a particular temper designation, such as an -O, -H, or -T temper designation. In embodiments, tempering may enable cold working of the disk by improving or increasing the ductility of the material. It should be appreciated that the tempering process may be performed before the cutting process.

Next, the disk is bump formed in order to form a dome or substantially form the dome 206. It should be appreciated that the bump formed-dome may be referred to a formed dome or working dome, while the completed dome may be referred to as a dome or treated dome. In embodiments, a bump-forming machine is utilized to form the dome. Bump forming may include adding a bend to a portion of the sheet, repeatedly, until the entire or substantially all of the sheepsheet has a radius or bend. In embodiments, the bump-forming machine may include a panel bender, a press brake, or the like. During the forming process, a fit gauge or various fit check tools may be utilized to check the degree of bend being applied to the disk. As noted above, tolerances may be less rigid than other methods, which decreases costs and time associated with the manufacturing process. The fit check tools may be two-dimensional tools that are arranged along a portion of the disk and/or formed dome in order to measure an amount of bend (e.g., radius) of the disk.

In various embodiments, a flange is added to the formed dome 208. For example, a flanging machine may add an upper flange to the formed dome. As noted above, fit check tools may be used to check the flange and/or the formed dome after the flanging operation. After the flanging operation, the formed dome may be considered in "near-net" shape. In other words, the formed dome is substantially in the final shape of the treated dome, however, may include extra material in various locations, such as at the center.

The method may continue with one or more heat-treating processes 210. For example, in various embodiments, a first heat-treating process may be utilized to reduce residual stresses in the formed dome, to harden the formed dome, to strength the formed dome, or enable cold working of the formed dome. By way of example only, residual stresses may be the result of the previous forming processes. In embodiments, a second heat-treating process may be a tempering process in order to strengthen the formed dome. For example, an -O, -H, or -T temperate designation may be applied. In one example, a -T6, a -T62, or a -T651, temper designation may be applied to increase the strength of the material. In embodiments, one or more heat-treating processes may include a water quench, which may lead to warpage. Accordingly, to reduce the likelihood of warpage, glycol may be added to the water. In embodiments, glycol is added to the water utilized in the water quench process. In various embodiments, glycol may be included in concentrations of between approximately 1 percent and approximately 10 percent, between approximately 10 percent and approximately 15 percent, between approximately 15 percent and approximately 20 percent, between approximately 20 percent and approximately 25 percent, or any other reasonable range. Furthermore, in embodiments, glycol may be included in concentrations of between approximately 5 percent and approximately 8 percent, between approximately 10 percent and approximately 13 percent, between approximately 15 percent and approximately 18 percent, or any other reasonable range. Glycol slows the heat transfer rate, which reduces the likelihood of warpage. It should be appreciated that the formed dome may be checked after the water quench and, if warpage occurs, additional forming processes may be utilized to correct the warpage, such as a hydraulic ram or the like.

In various embodiments, a final machining process is used to remove excess material from the formed dome 212. Prior to the machining process, the formed dome may be considered in near-net shape and be heat-treated. In embodiments, a vertical turning lathe, or the like, may be utilized to remove excess material from the formed dome 212. For example, the formed dome may be thicker than desired. Tolerances for the machining process may be tighter than the forming process, described above, to ensure compliance with customer specifications. It should be appreciated that the machining process may be performed prior to heat treatment, however, the risk of warpage is increased with a thinner part.

Accordingly, systems and methods of the present disclosure are utilized to form domes that may be incorporated into launch vehicles. As noted above, several parts of the manufacturing process may have loose tolerances, thereby reducing costs for manufacturing. Additionally, heat treatments along the process may be specifically selected to assist with subsequent machining operations. As a result, a cheaper and faster fabrication process is described.

Figure 3:
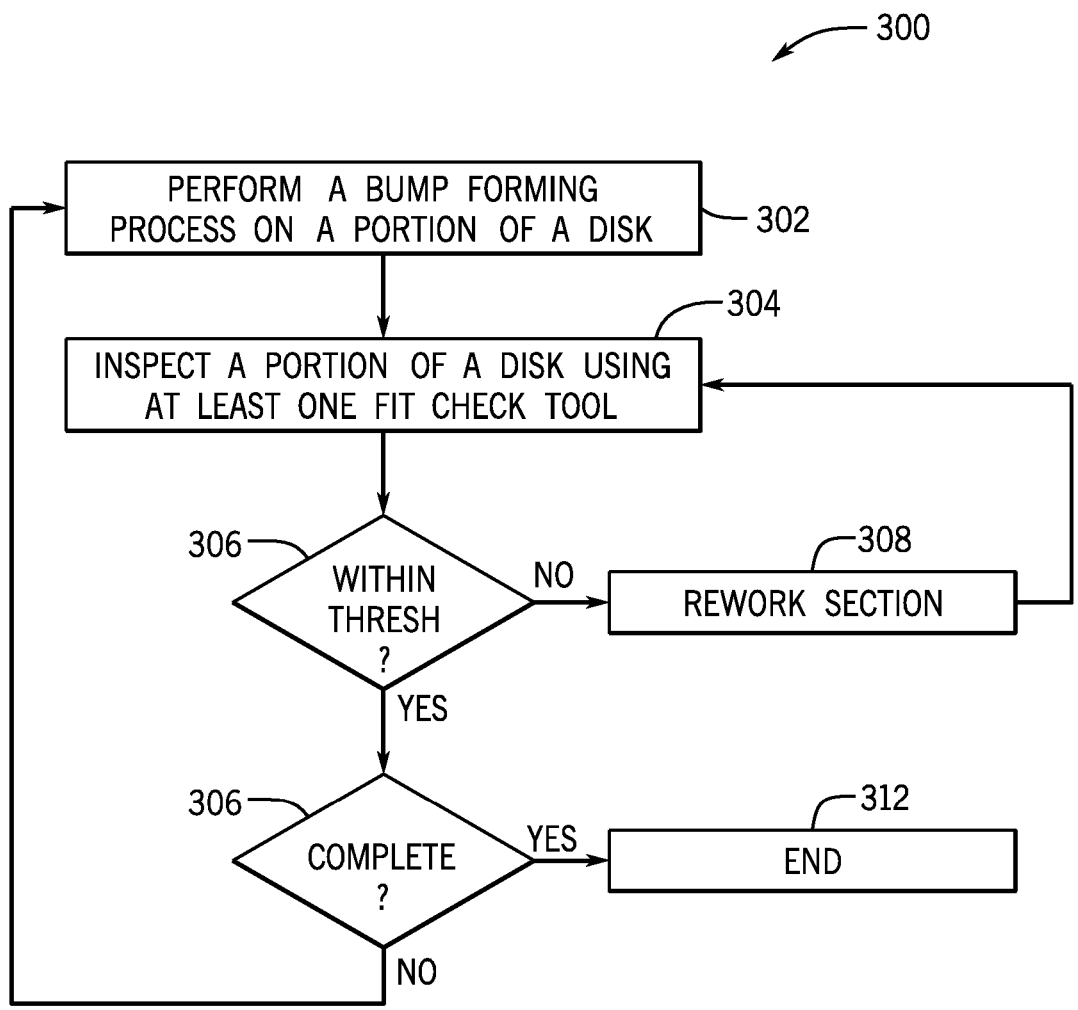
FIG. 3 illustrates a flow chart of an embodiment of a method for forming a dome, in accordance with embodiments of the present disclosure.

FIG. 3 is a flow chart representing a method 300 for forming and checking a part during a fabrication operation. For example, the fabrication operation may be a bump-forming process that is utilized to make a dome, as described above. The method begins with performing a bump forming process 302. During the bump forming process, a bend or curvature is applied to segments of a plate or sheet. Partial or segmented portions of the plate may be slightly bent in order to generate a part with an overall bend or curvature. As noted above, the part may be a disk and the bump forming process may be utilized to form the disk into a 2:1 elliptical profile, among other options. In various embodiments, tolerances of the bump forming process may be larger than traditional manufacturing methods, such as the above-described hot-spinning process. Still, tolerances may be checked throughout the process, for example, on segments of the disk. One or more fit check tools may be used in order to inspect portions of the disk 304. For example, the fit check tools may be two-dimensional tools that evaluate a radius of a bend applied to the disk, among other options. A determination is made whether the segment bend is within a threshold amount (e.g., without the tolerances provided) 306. If not, the section may be reworked 308 and then inspected a second time. If the part is within the threshold, a determination is made whether the part is complete 310. If not, a different section is formed using the bump forming process. If the part is complete, then the method ends 312. In this manner, the disk may be manipulated to form the elliptical dome. The bump forming process enables partial portions of the disk to be formed and checked, rather than forming the entire dome and then checking for tolerances. As a result, discrepancies may be corrected early in the process, which may further lead to reduced costs. It should be appreciated that a similar process may also be incorporated for other steps of the method 200, such as the flanging process and the machining process. That is, different segments may be processed and then checked, using one or more fit check tools, to enable early identification of discrepancies for rework.

Figure 4:
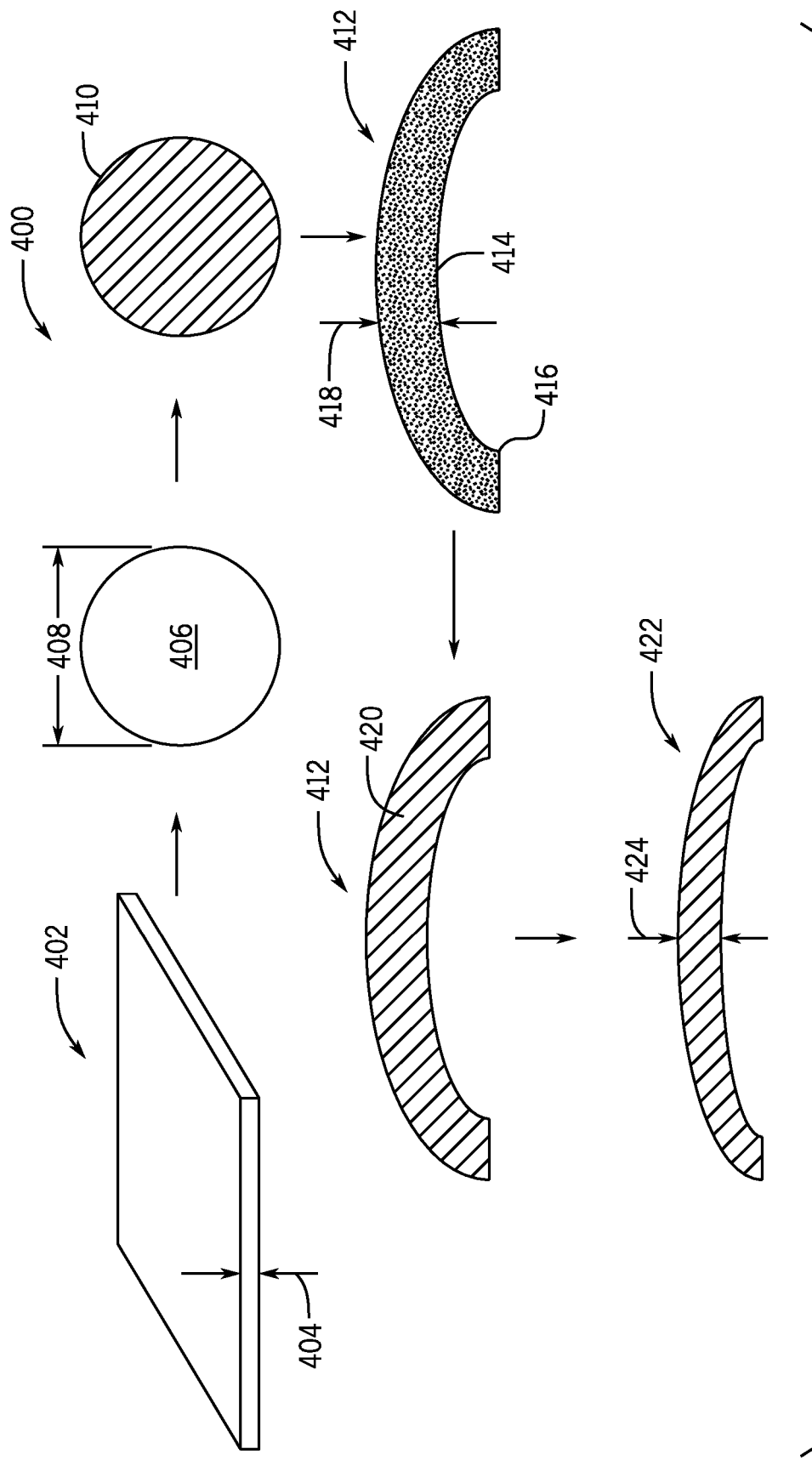
FIG. 4 illustrates a schematic diagram of an embodiment of a process for forming a dome, in accordance with embodiments of the present disclosure.

FIG. 4 is a schematic diagram illustrating a process 400 for converting a flat sheet of material, such as aluminum, into an elliptical dome. The process 400 is provided as an example only, and as noted above, may be performed in a different order, and also include additional steps, unless otherwise specifically stated. The process 400 begins with a flat plate 402. The plate 402 has a thickness 404, as described above, which may be thicker than a dome thickness. A disk 406 is cut from the plate 402, for example, using a waterjet machine or other cutting process. The disk 406 has a diameter 408, which is larger than a dome diameter, as noted herein. The diameter 408 may be approximately 20 percent larger than the dome diameter. As will be appreciated, the larger diameter 408 enables machining and forming processes to the disk 406, which may have a reduced diameter after the machining and forming operations. In various embodiments, the disk may be annealed, as illustrated by the hatching 410. The annealing may be performed to a variety of temper designations, as noted herein. Annealing may relieve stresses in the disk 406 and/or strengthen the disk 406 for later processes.

In various embodiments, the process 400 further includes bump forming the disk 406 to generate a formed disk 412 (shown as a cross-section). The formed disk 412 includes a bend 414, which may substantially form a 2:1 elliptical profile, however, it should be appreciated that other profiles may also be obtained using the bump forming forces. Additionally machining may add a flange 416 to the formed disk 412. Thereafter, the formed disk 412 may be substantially "near-net" after checking for tolerances. As illustrated, the formed disk 412 includes a thickness 418, which may be less than the thickness 404 of the flat plate 402, for example, due to the machining processes. As will be described below, the thickness 418 may still be larger than desired, which may add weight to the final dome.

Embodiments further include the one or more heat-treating processes, as described above. For example, a processes may be utilized to both reduce residual stresses and a second process may add strength to the formed disk 412, for example, to temper the formed disk 412 to a variety of tempering designations, such as those noted above, among others. However, it should be appreciated that other tempering designations may also be used. The formed disk 412 is illustrated in FIG. 4 with a hatching 420 to illustrate the tempering. In various embodiments, a machining process may remove excess material from the formed disk 412, thereby forming a dome 422 (shown in cross-section). A dome thickness 424 may be less than the thickness 418, which may reduce an overall weight of the dome 422. In this manner, the dome 422 is formed without using expensive methods, such as hot-spinning.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for forming a dome used in a launch vehicle, comprising:

cutting a disk from a plate, the disk having a first disk diameter;

forming a bend in the disk, the bend applying a curvature to at least a portion of the disk using at least one bump forming process performed on a bump forming machine, the disk having a second disk diameter after the forming;

performing a first heat-treating process to the disk, the first heat-treating process reducing residual stresses within the disk;

performing a second heat-treating process to the disk, the second heat-treating process increasing a strength of the disk; and machining the disk to remove at least a portion of a thickness of the disk.

2. The method of claim 1, further comprising:
performing a tempering process to the disk, the tempering process increasing a ductility of the disk.

3. The method of claim 2, wherein the tempering process applies a -O temper designation to the disk.

4. The method of claim 1, further comprising:
quenching the disk after at least one of the first heat-treating process or the second heat-treating process, wherein water used to quench the disk includes glycol to slow heat transfer from the disk.

5. The method of claim 1, further comprising:
forming a flange onto the disk, the flange positioned along an outer diameter of the disk.

6. The method of claim 1, wherein the first disk diameter is greater than the second disk diameter.

7. The method of claim 1, further comprising:
determining the bend is within a threshold tolerance, via a fit check tool.

8. The method of claim 1, wherein the plate is formed from 2219 aluminum alloy.

9. The method of claim 1, wherein the second heat-treating process applies a -T62 temper designation to the disk.

10. A method for forming a dome used in a launch vehicle, comprising:
cutting a disk from a flat plate;
increasing a ductility of the disk, via an annealing process;
shaping the disk into an elliptical profile, via a bump forming process performed on a bump forming machine;
reducing a residual stress in the disk, via a first heat-treating process;
increasing a strength of the disk, via a second heat-treating process; and
reducing a thickness of the disk, via a machining operation.

11. The method of claim 10, wherein the annealing process applies a -O temper designation to the disk.

12. The method of claim 10, wherein the elliptical profile is 2:1 width to depth ratio.

13. The method of claim 10, wherein the plate is formed from 2219 aluminum alloy.

14. The method of claim 10, wherein the second heat-treating process applies a -T62 temper designation to the disk.

15. The method of claim 10, wherein the annealing process is performed before the shaping, the first heat-treating process is performed before the increasing of the strength, and the second heat-treating process is performed before the reducing of the thickness.

16. The method of claim 10, wherein the shaping further comprises applying at least one bend to a portion of the disk, further comprising:
determining the at least one bend is within a threshold tolerance, via a fit check tool.

17. A method for forming a dome used in a launch vehicle, comprising:
cutting a circular disk from a 2219 aluminum alloy plate, the disk having a first diameter;
forming, using a bump forming process performed on a bump forming machine, the circular disk into a dome having a 2:1 width to depth ratio elliptical profile, the dome having a second diameter;
performing an annealing process to the dome to reduce residual stresses within the dome;
performing a tempering process to the dome to increase a strength of the dome, the tempering process applying a -T62 temper designation to the dome; and
removing, using a machining process, at least a portion of a thickness of the dome.

18. The method of claim 17, further comprising:
performing a tempering process to the disk, prior to forming the dome, the tempering process increasing a ductility of the disk and applying a -O temper designation to the disk.

19. The method of claim 17, further comprising:
coupling the dome to a barrel section of the launch vehicle.

20. The method of claim 17, further comprising:
forming a flange onto the dome.

* * * * *